No. 653,877. Patented July 17, 1900.
F. A. PERRET.
MOTOR CARRIAGE.
(Application filed Jan. 25, 1900.)
(No Model.) 2 Sheets—Sheet 2.
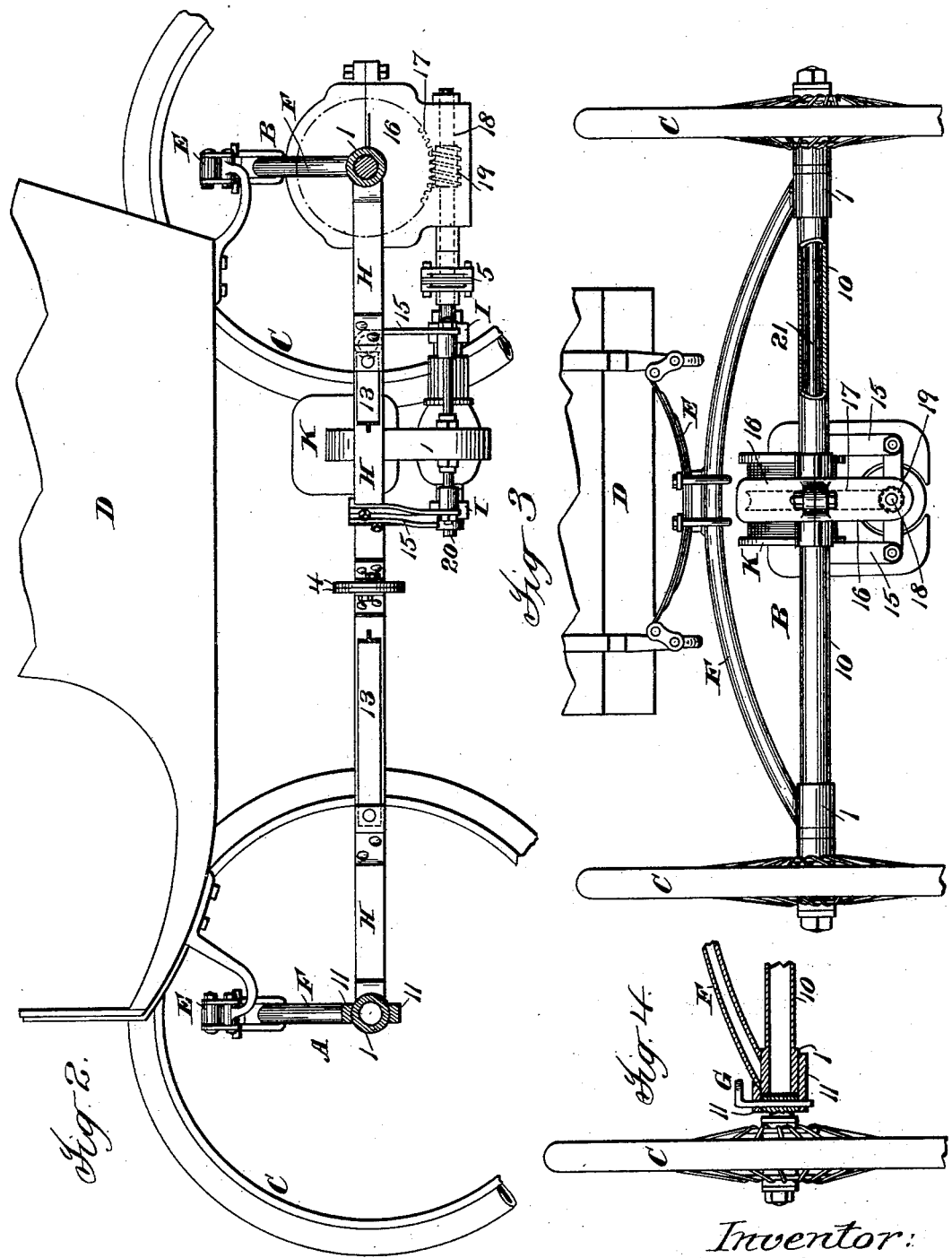

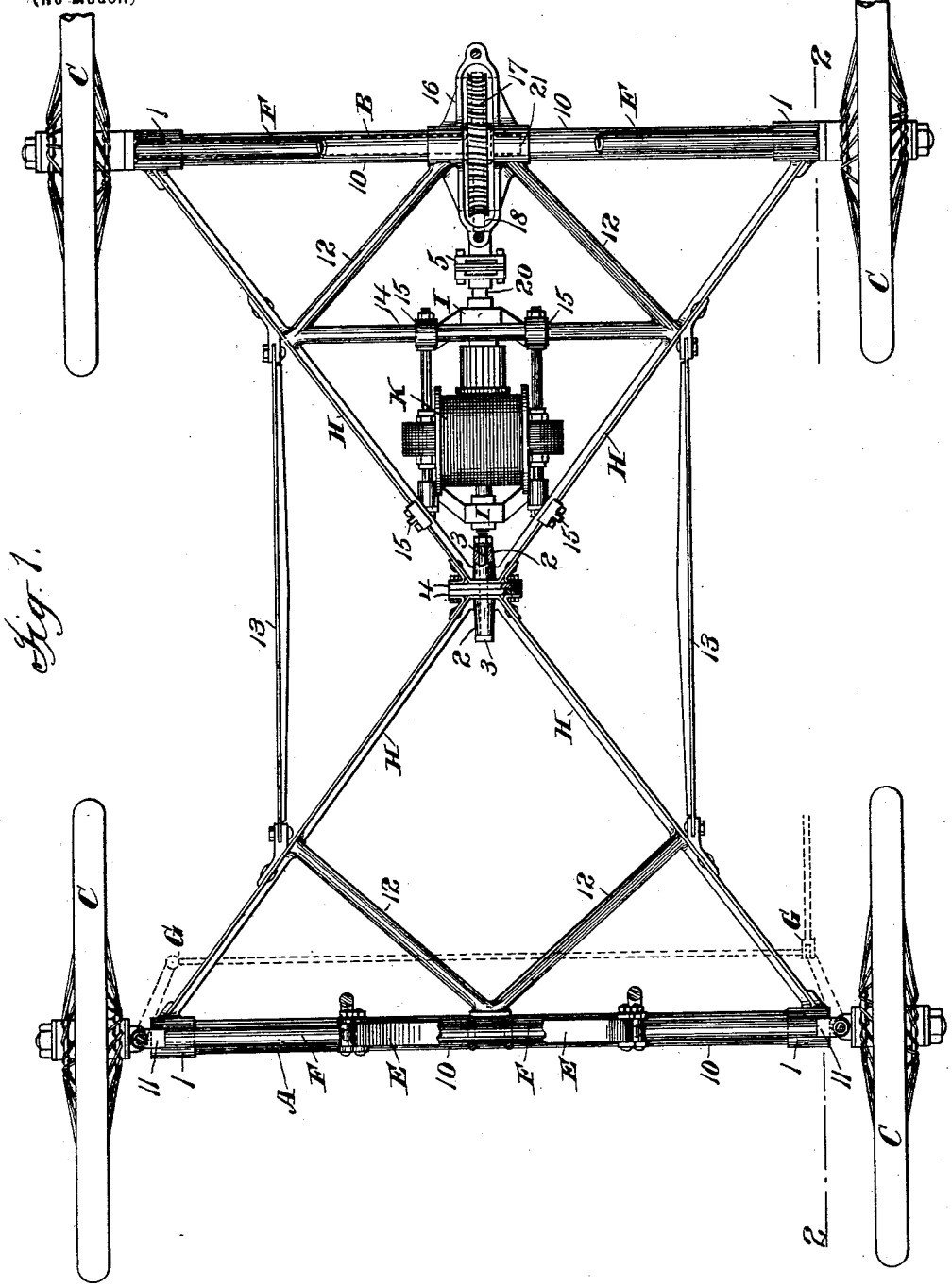

UNITED STATES PATENT OFFICE.

FRANK A. PERRET, OF NEW YORK, N. Y., ASSIGNOR TO THE PERRET STORAGE BATTERY COMPANY, OF SAME PLACE.

MOTOR-CARRIAGE.

SPECIFICATION forming part of Letters Patent No. 653,877, dated July 17, 1900.

Application filed January 25, 1900. Serial No. 2,739. (No model.)

*To all whom it may concern:*

Be it known that I, FRANK A. PERRET, a citizen of the United States, residing at New York city, (Brooklyn,) county of Kings, and State of New York, have invented certain new and useful Improvements in Motor-Carriages, fully described and represented in the following specification and the accompanying drawings, forming a part of the same.
The especial object of the present invention is to provide an improved frame for connecting the running-gear of motor-carriages by which the driving power shall be so transmitted that an efficient construction may be secured with very light running-gear and frame, while providing for the free tilting of the axles independently of each other. While, however, this portion of the invention is especially applicable to motor-carriages, my improved frame may be applied also in connection with other carriages.

A further object of the invention is to provide an improved motor mounting and driving mechanism for motor-carriages which is preferably used in connection with my improved frame, the complete construction forming a very simple, light, and efficient motor-carriage.

For a full understanding of the invention a detailed description of a motor-carriage embodying all the features of the invention in their preferred form will now be given in connection with the accompanying drawings, forming a part of this specification, and the features forming the invention then specifically pointed out in the claims.

In the drawings, Figure 1 is a plan view of the running-gear and frame with parts broken away for illustration. Fig. 2 is a vertical longitudinal section on line 2 of Fig. 1 with the connecting-bar broken away for illustration. Fig. 3 is a rear view of the carriage. Fig. 4 is a detail of one end of the front axle.

Referring to said drawings, A is the front axle; B, the rear or driving axle; C, the wheels on these axles, and D the carriage-body, which may be mounted in any suitable manner, but is shown as carried by front and rear springs E, mounted on curved bars F, rising from the opposite ends of the axles, so that the weight of the carriage-body is supported by the axles close to the wheels. The axles are preferably formed, as shown, of stationary tubes 10, reinforced at the ends, where the frame-bars are connected, as shown at 1, a strong light axle being thus secured. The wheels C on the forward axle A may be mounted in any suitable manner, but are shown as mounted in yokes 11 on the reinforced portions of the axle, so as to turn thereon for steering, and driving connections or gear G for securing the proper movement of the wheels are indicated in dotted lines which may be actuated in any suitable manner for steering the vehicle.

To the reinforced portions of the tubes 10 of each axle are rigidly connected at the opposite ends of the tubes the V-frames H H, so as to transmit the strains from and to points close to the wheels C, which V-frames meet at their apexes between the axles. These V-frames H H are shown as formed of T-irons to secure the strength and rigidity required with light metal, and they are preferably strengthened by brace-bars 12, running from about the middle of the tubes 10 to the bars forming the frames H H and at substantially right angles to the latter, these brace-bars preferably consisting of metal tubes, as shown, so as to secure the strength and stiffness required with light weight. The bars forming the V-frames H H are connected at their apexes by a joint permitting the V-frames to tilt or turn vertically independently of each other. As shown, this connection is formed by sleeves 2, formed on the V-frames, which sleeves form a long bearing for a bolt 3, passing through the sleeves, and plates 4 are preferably secured to the ends of the frames to form enlarged bearing-surfaces holding the frames rigidly in line, while at the same time securing an extended wearing-surface for the rotary movement. The frames H H are preferably strengthened by connecting-bars 13, which connect the front and rear V-frames at points about opposite the brace-bars 12. It is obvious that these connecting-bars 13 must be arranged so as to permit the turning of the V-frames upon the central pivotal connection formed by the bolt 3, and for this purpose the connecting-bars 13 are shown as formed of comparatively-light T-bars, so that the twisting of the bars permits the rotation of one V-frame relatively to the other. The same result may obviously be secured by the use of rigid connecting-bars 13, jointed to the V-frames in such a manner as to permit the frames to turn on the bars, as by a ball-joint or otherwise.

The construction thus far described is complete in itself and may be used with any suitable driving mechanism for the purpose of transmitting power between the two axles of any carriage. In connection with this frame, however, I have devised a form of motor mounting and driving mechanism, especially adapted for an electric motor, which is preferably used in connection with this frame and forms a part of the present invention. In the construction shown I use a cross-bar 14, extending between the opposite bars of the rear V-frame and preferably connecting these bars at about the same points as the brace-bars 12 connect therewith, this cross-bar 14 preferably consisting of a metal tube, as shown. From this cross-bar 14 and the side bars of the rear V-frame H, I drop by hangers 15 a motor-supporting frame I of suitable form, in which frame is mounted the motor K, which may be of any suitable construction, being shown as an electric motor of common form, motor-frame I and motor K being mounted in line with the center of the rear axle B. The tube 10 of the rear axle B is divided centrally, the two parts being united by a box 16, within which rotates a worm-gear 17, carried by driving-shaft 21 within the tube 10 of the axle and carrying one of the rear wheels, this shaft terminating in the box 16, as indicated in dotted lines in Fig. 1. The other rear wheel may be mounted in any suitable manner, as on a stud secured in tube 10. Beneath this worm-gear 17 is mounted in the box 16 a horizontal worm-shaft 18 at right angles to the axle B and carrying the worm 19, engaging the worm-wheel 17. The worm-shaft 18 is in line with the motor-shaft 20 and connected thereto, preferably by a flexible coupling 5. The driving power is thus applied directly to the rear driving-shaft 21 and one of the wheels and transmitted from the rear axle at points near the wheels to the front axle at points near the wheels, so that light axles may be used with the strength and efficient application of the power required. It will be understood that other connections than the worm-gear shown may be used between the shafts 18 21.

What I claim is—

1. The combination with front and rear carriage-axles, of two V-frames converging from points near the ends of the axles and united between the axles and at the apexes of the frames by a joint permitting vertical rotation of the frames independently of each other, and brace-bars between the side bars of said V-frames and the axles, substantially as described.

2. The combination with front and rear carriage-axles, of two V-frames converging from points near the ends of the axles and united between the axles and at the apexes of the frames by a joint permitting vertical rotation of the frames independently of each other, and bars connecting said V-frames on opposite sides and permitting the vertical rotation of the V-frames independently of each other, substantially as described.

3. The combination with front and rear carriage-axles, of two V-frames converging from points near the ends of the axles and united between the axles and at the apexes of the frames by a joint permitting vertical rotation of the frames independently of each other, brace-bars between the side bars of said V-frames and the axles, and bars connecting said V-frames on opposite sides and permitting the vertical rotation of the V-frames independently of each other, substantially as described.

4. The combination with the axles A, B, of the V-frames H, H, connected at their apexes by a joint permitting vertical rotation of the frames independently of each other, brace-bars 12 between the axles and the side bars of said frames, and bars 13 connecting the side bars of said frames on opposite sides and constructed to yield under torsional strain to permit the vertical rotation of the V-frames independently of each other, substantially as described.

5. The combination with front and rear axles A, B, of the V-frames H, H, connected at their apexes by a joint permitting vertical rotation of the frames independently of each other, cross-bar 14 connecting the side bars of the rear frame H, a motor carried by said cross-bar and the side bars of the rear frame H, brace-bars 12 between the side bars of the rear frame H and the axle B, and a driving connection between said motor and the rear axle between the brace-bars 12, substantially as described.

6. The combination with front and rear axles A, B, of the V-frames H connected at their apexes by a joint permitting vertical rotation of the frames independently of each other, cross-bar 14 connecting the side bars of the rear frame H, a motor carried by said cross-bar and the side bars of the rear frame H, brace-bars 12 between the side bars of the rear frame H and the axle B, driving-shaft 21 in the tubular rear axle, a worm-gear on the driving-shaft between the brace-bars 12, and a worm-shaft in line with the motor-shaft and driven directly therefrom for driving said worm-gear, substantially as described.

7. The combination with front and rear carriage-axles, of two V-frames converging from points near the ends of the axles, and each having at its apex a sleeve 2 extending inwardly from the apex of the frame, and bolt 3 in said sleeves securing the frames together with the ends of the frames abutting, substantially as described.

8. The combination with front and rear carriage-axles, of two V-frames converging from points near the ends of the axles, and each having at its apex a sleeve 2 extending inwardly from the apex of the frame, vertical bearing-plates 4 at the abutting ends of the frames, and bolt 3 in said sleeve securing the frames together, substantially as described.

9. The combination with front and rear carriage-axles, of two V-frames converging from points near the ends of the axles and abutting at their apexes, vertical bearing-plates 4 at the abutting ends of the frames, and means for securing the frames together and permitting vertical rotation of the frames and plates 4 independently of each other, substantially as described.

In testimony whereof I have hereunto set my hand in the presence of two subscribing witnesses.

FRANK A. PERRET.

Witnesses:
C. J. SAWYER,
A. A. V. BOURKE.